United States Patent [19]
Gaertner

[11] Patent Number: 5,680,560
[45] Date of Patent: Oct. 21, 1997

[54] METHOD AND DEVICE FOR GRAPHICALLY SETTING MULTIPLE PARAMETER RANGES

[75] Inventor: David Bernard Gaertner, Austin, Tex.

[73] Assignee: International Business Machines Corporation, Armonk, N.Y.

[21] Appl. No.: 534,520

[22] Filed: Sep. 27, 1995

Related U.S. Application Data

[63] Continuation of Ser. No. 157,862, Nov. 19, 1993, abandoned.

[51] Int. Cl.$^6$ .................................................. G06F 3/14
[52] U.S. Cl. ........................................ 395/339; 395/140
[58] Field of Search ............................. 395/155, 161, 395/157, 159, 156, 158, 160, 140, 326, 339, 348, 961, 965, 966; 345/145; 364/188, 190

[56] References Cited

U.S. PATENT DOCUMENTS

| | | | |
|---|---|---|---|
| 5,016,170 | 5/1991 | Pollalis et al. | 395/140 X |
| 5,270,806 | 12/1993 | Venable et al. | 395/353 X |
| 5,309,556 | 5/1994 | Sismilich | 395/349 |
| 5,337,405 | 8/1994 | Lindauer et al. | 395/764 |
| 5,365,360 | 11/1994 | Torres | 395/348 |
| 5,375,199 | 12/1994 | Harrow et al. | 395/339 |
| 5,479,592 | 12/1995 | Steinhouse | 395/140 |
| 5,500,938 | 3/1996 | Cahill et al. | 395/326 |

OTHER PUBLICATIONS

IBM Technical Disclosure Bulletin, vol. 34, No. 4A, Sep. 1991, Multi–Dimensional Booktab Control for Graphical User Interfaces, pp. 208–210.

IBM Technical Disclosure Bulletin, vol. 34, No. 8, Jan. 1992, Showing All Service Group and Configuration File References To A Remote Procedure Call Object, pp. 380, 381.

IBM Technical Disclosure Bulletin, vol. 34, No. 9, Feb. 1992, Tree View of Remote Procedure Call Objects., pp. 176, 177.

IBM Technical Disclosure Bulletin, vol. 34, No. 10B, Mar. 1992, Group Membership View., pp. 309, 310.

IBM Technical Disclosure Bulletin, vol. 34, No. 9, Feb. 1992, Graphical User Interface For Distributed Time Service., pp. 179, 180.

IBM Technical Disclosure Bulletin, vol. 33, No. 6A, Nov. 1990, Hybrid Dial/Slider Icon, pp. 326, 327.

*Primary Examiner*—Raymond J. Bayerl
*Assistant Examiner*—Crescelle N. dela Torre
*Attorney, Agent, or Firm*—Jeffrey S. LaBau

[57] ABSTRACT

A method, system and program for simultaneously specifying a first and a second range for a first and a second parameter respectively. A control window whose axes represent the two parameters and a control element movable therein, typically by means of a pointing device, are presented on a display coupled to a computer system. The coordinates of a first and a second position of the control element are determined. The first range is adjusted according to the first components of the coordinates of the first and second positions and the second range according to the second components of the coordinates of the first and second positions. After the ranges are specified, a first operation is designated which will be executed if a data stream of the first and second parameters satisfies the first and second ranges. The data stream is monitored to determine if the first and second ranges are satisfied. The first operation is executed on the computer system if the first and second ranges are satisfied.

31 Claims, 8 Drawing Sheets

METHOD AND DEVICE FOR GRAPHICALLY SETTING MULTIPLE PARAMETER RANGES

This is a continuation of application Ser. No. 08/157,862 filed Nov. 19, 1993, now abandoned.

BACKGROUND OF THE INVENTION

This invention generally relates to a graphical user interface for displaying data on a display of a data processing system in an object-oriented software program. More particularly, it relates to a single control for changing a plurality of parameter ranges.

To provide accessibility and ease of use to the functions of a modern day data processing system, it has become commonplace to construct a Graphical User Interface (GUI) to control the system. To maximize the amount of information while maintaining the legibility of that information presented by computer display, certain display controls have been employed.

Traditionally, the values of scaled parameters are controlled by the use of a slider or a knob in a graphical user interface. Such parameters can be changed to a value within a given range, e.g., from zero to a predetermined maximum value, or to encompass a range of values by manipulating the appearance of the slider or knob in the GUI. As the parameters are independent of each other, there is generally one control for each parameter. To change a parameter associated with a slider or a knob, the user will bring a pointer, typically controlled by a mouse, to a particular portion of the slider or a knob, and manipulate the slider or knob appearance. Other user interfaces allow the user to specify exact numerical values by means of data entry fields in a window or dialog box.

While this type of graphical user interface is adequate, as the number of applications which share the available presentation space in the GUI proliferate in number, screen space becomes a premium. Generally, the display space allocated to each application's window will shrink in size. When an application uses a number of controls for each of the variables, not all of them can be displayed at the same time. Therefore, it would be desirable to have a control which could manipulate a plurality of independent variables. This invention teaches such a control.

SUMMARY OF THE INVENTION

It is therefore an object of the present invention to provide a single control for manipulating a plurality of scaled parameters in a graphical user interface.

It is another object of the present invention to simplify the graphical user interface by eliminating the need for additional controls to control each scaled parameter.

It is another object of the present invention to set ranges for a plurality of parameters by manipulating a control in a graphical user interface.

It is another object of the invention to set a plurality of ranges for each of plurality of a parameters in a graphical user interface.

These and other objects are accomplished by a method, system and program for simultaneously specifying a first and a second range for a first and a second parameter respectively. A control window whose axes represent the two parameters and a control element movable therein, typically by means of a pointing device, are presented on a display coupled to a computer system. The coordinates of a first and a second position of the control element are determined. The first range is adjusted according to the first components of the coordinates of the first and second positions and the second range according to the second components of the coordinates of the first and second positions. After the ranges are specified, a first operation is designated which will be executed if a data stream of the first and second parameters satisfies the first and second ranges. The data stream is monitored to determine if the first and second ranges are satisfied. The first operation is executed on the computer system if the first and second ranges are satisfied.

The user interface displays a highlighted region within the control window representing the first and second ranges having a first and a second vertex colocated at the first and the second positions respectively. The invention also allows multiple ranges to be specified for the first and second parameters within the control window. The multiple ranges can be combined so that the first operation is executed if the data stream satisfies all, some or one of the ranges. Further, other operations can be specified for each additional range. Each set of ranges is displayed within the control window, preferably in a distinct manner for easy identification.

BRIEF DESCRIPTION OF THE DRAWINGS

These and other objects, features and advantages will be more easily understood in connection with the attached drawings and following description.

DETAILED DESCRIPTION OF THE DRAWINGS

The invention may be run on a variety of computers or collection of computers under a number of different operating systems. The computer could be, for example, a personal computer, a mini computer or mainframe computer or a workstation in a network such as a Local Area Network or Wide Area Network or larger teleprocessing system. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2 Model 50, 60 Systems* IBM Corporation, Part No. 68X2224 Order Number S68X-2224 and *Technical Reference Manual Personal Systems/2 (Model 8.0)* IBM Corporation Part No. 68X 2256 Order Number S68X-2254. One operating system which an IBM PS/2 personal computer may run is IBM's OS/2 2.0 (TM).

For more information on the IBM OS/2 2.0 Operating System, the reader is referred to *OS/2 2.0 Technical Library, Programming Guide Vol.* 1, 2, 3 *Version* 2.00 Order Nos. 10G6261, 10G6495, 10G6494.

Figure 1:
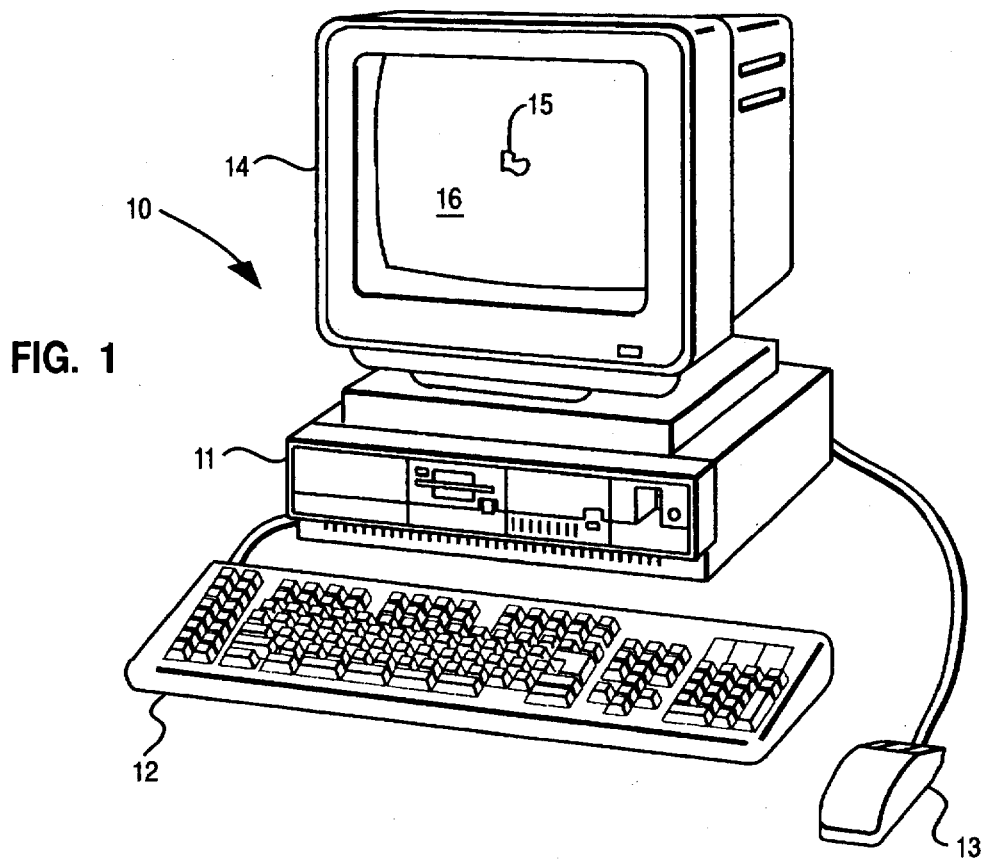
FIG. 1 shows a computer comprising system unit, keyboard, mouse and display.

In FIG. 1, a computer 10, comprising a system unit 11, a keyboard 12, a mouse 13 and a display 14 are depicted. The screen 16 of display device 14 is used to present the visual changes to the data object. The graphical user interface supported by the operating system allows the user to use a point and shoot method of input by moving the pointer 15 at a particular location in the GUI displayed on the screen 16 and press one of the mouse buttons to perform a user command or selection.

Figure 2:
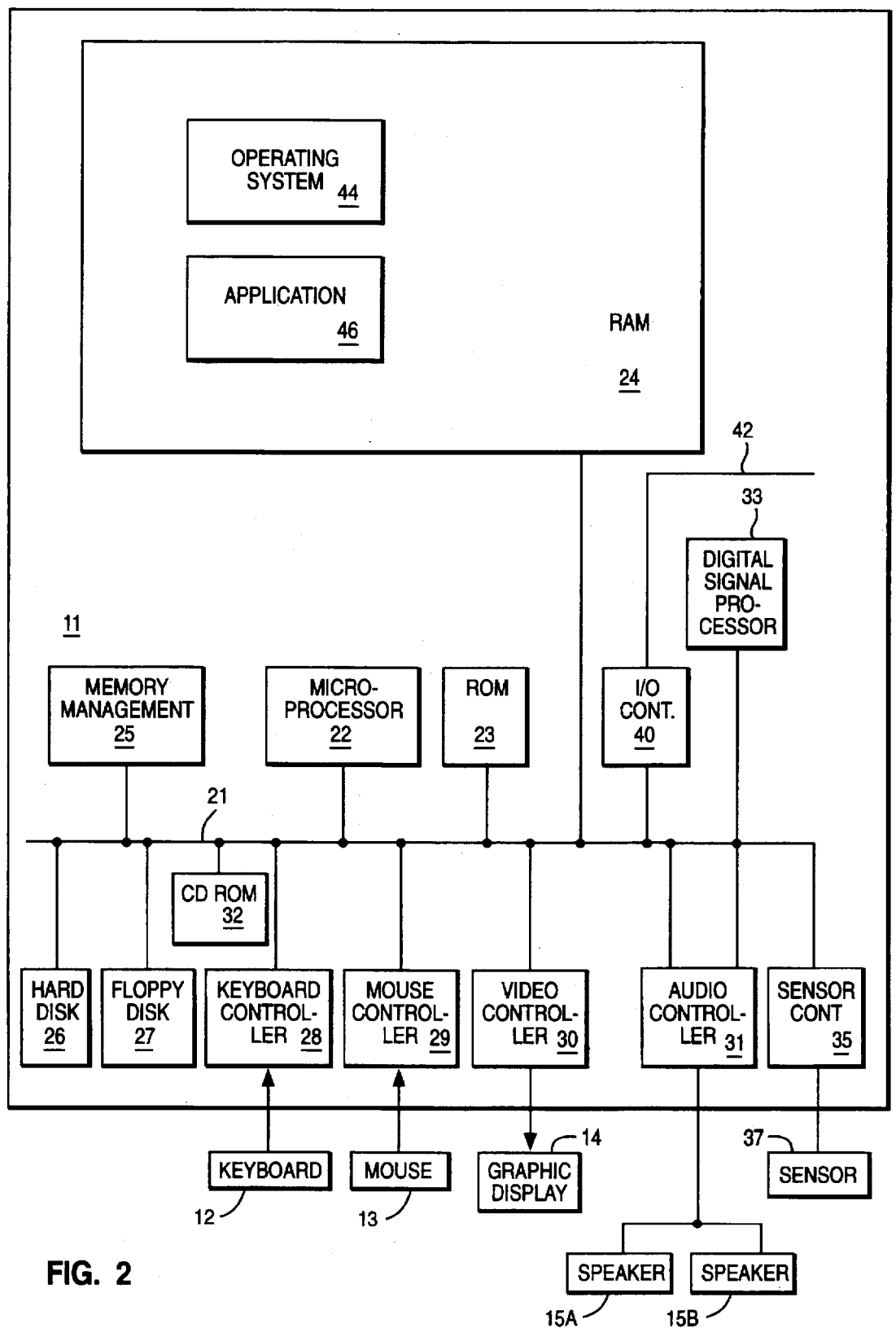
FIG. 2 is a block diagram of the components of the computer shown in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. Also coupled to the system bus 21 is digital signal processor 33 which is incorporated into the audio controller 31. A sensor controller card 35 is coupled to the system bus and converts the electrical signals from sensor 37 into messages usable by the computer system. The sensor 37 could measure any of a bright variety of parameters, for example, it could be a thermocouple to measure temperature. An I/O controller 40 such as a Token Ring Adapter enables communication over a network 42 to other similarly configured data processing systems.

Pictured within random access memory 24 is operating system 44 and application program 46. The operating system 44 controls the graphical user interface presented by the computer on the display and the access of other application programs to user input from the input devices. Some operating systems may operate in cooperation with a presentation manager to manage the graphical user interface. For example, Windows 3.1™, a presentation manager, operates over the Disk Operating System (DOS) for the IBM compatible computers. On the other hand, OS/2™ is a single software product which includes both presentation manager and operating system functions. One skilled in the art would recognize that the block 44 represents the code which performs both sets of functions no matter how they may be configured. In the graphical user interface, the objects, e.g., the operating system, operating system utilities, applications and data files are represented by icons or windows on the system display. The user may move the cursor or pointer to an icon position to open or otherwise manipulate the object. For example, to invoke the application 46, the user would move the mouse pointer to an icon in a GUI which represented the application and double click on the left mouse button.

Although such operating systems will allow a plurality of application programs to run concurrently, for the sake of simplicity, only one application is shown in the random access memory 24. Nonetheless, as the increasing sophistication of operating systems and users is addressed by this invention, as with the growing number of applications, a graphical user interface quickly becomes crowded.

One of the preferred implementations of the present invention is that a set of instructions of a code module resident in the random access memory 24. For example, the control can be implemented as part of the operating system, or as a separate application program. Until required by the computer system, the set of instructions may be stored in another computer memory, for example, in the hard disk drive 26, an optical disk for eventual use in the CD ROM drive 32 or in a floppy disk for eventual use in the floppy disk drive 27. If the control is a part of the operating system, a new control type would be defined together with the new control type's characteristics and behaviors. When an application wanted to use such control, it would create a child window or object and classify it as this type of control. A separate data space would be stored in RAM describing the scaled parameters which would be controlled and any required information relating to the control characteristics or behaviors.

As a separate application program, the control could be implemented in two different ways depending on the capabilities of the base operating system. If the operating system keeps track of the location of objects in its display space, such as windows, icons, pointers, etc., the application could use these operating system facilities to help create and track position of windows and pointer which comprise the various parts of the control. If the operating system did not keep track of window position and objects in the display space, the programmer would have to write his own routines to keep track of the control components.

Figure 3:
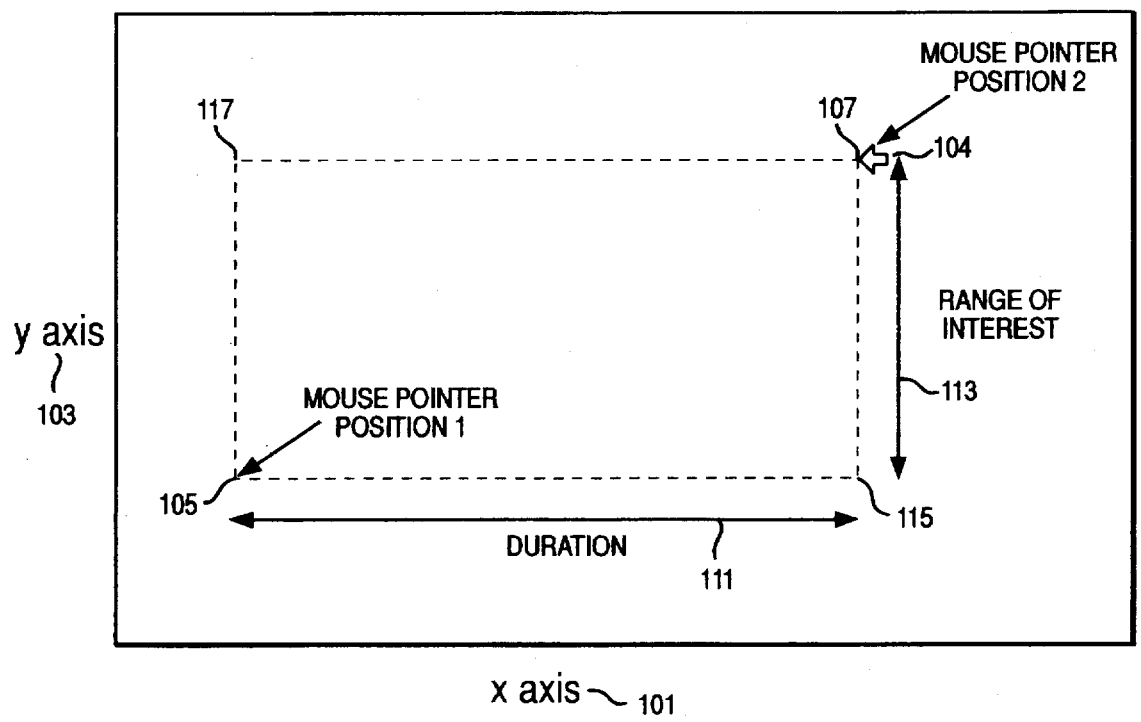
FIG. 3 is a generalized graphical user interface in which ranges for two variables are set.

The general method of setting a first and a second range for a first and a second parameter respectively within a GUI is described with reference to FIG. 3. As shown in the figure, the control window 100 includes an x-axis 101 and a y-axis 103. While these axes can represent any type of parameter, typically, the x-axis 101 represents the passage of time. Thus, the lower and upper limits on the x-axis may represent a duration of time, rather than a process that starts at $T_1$ and ends at $T_2$. The y-axis 103, may be used to represent a range of a parameter which varies with time such as speed, temperature, amount of disk spaced used, CPU utilization and so forth. Of course, both the y and x axes may represent ranges of their respective parameters bounded by absolute values. Alternatively, they may represent a difference normalized to a starting value or some other default so that the parameters can be measured according to some delta or percentage versus a starting value period.

To set the ranges, a control element 104, such as a mouse pointer, is moved to two positions within the control window 100. A separate icon or symbol may serve as the control element and be manipulated, e.g., grabbed and dragged, by the mouse or other pointing device. As shown in the figure, the mouse pointer was last positioned at position 105, a mouse button 104 depressed or similar action to designate that 105 is one of the points and has been moved to position 107, where the selection action occurs again. After both positions are selected, ranges 111, 113 for the parameters represented by the x and y axis 101, 103 are specified. As shown in FIG. 3, positions 115 and 117 could also be used to specify ranges 111 and 113.

Figure 4:
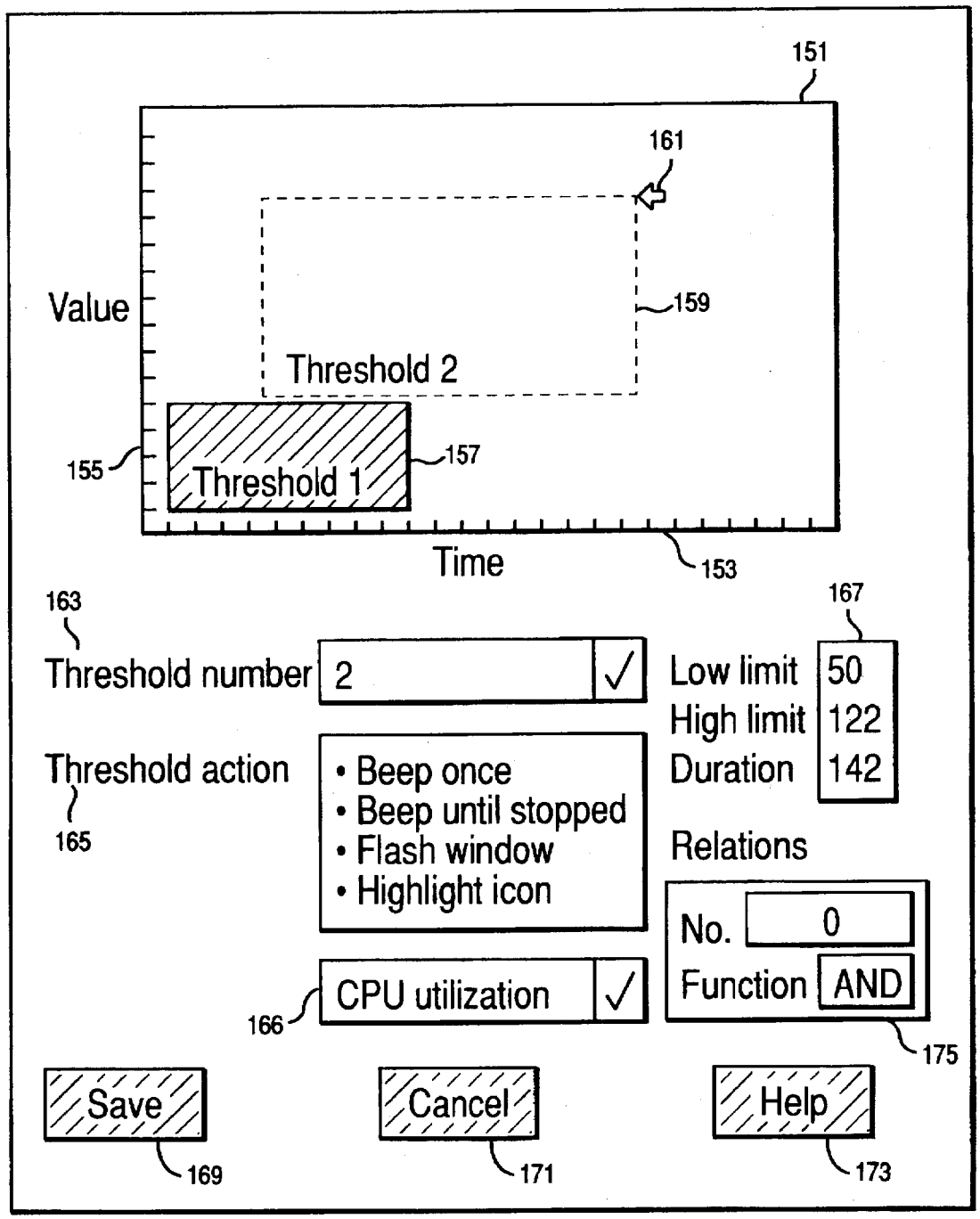
FIG. 4 is a more specific user interface in which two different sets of ranges for two parameters are set as well as operations to be performed by the computer system if these ranges are met.

A more detailed user interface is presented in FIG. 4. In dialog box 150, a control window 155 is presented. Along the x-axis 153, time is represented and along the y-axis 155, a value of a parameter, for example, temperature, is represented. Within the figure, a first set of ranges or threshold 157 has been set and is shown highlighted within the control window. A second set of ranges 159 is in the process of being set by the user. The mouse pointer 161 is shown at a second position before selection. Upon selection of that position, the second set of ranges 159 will also be highlighted, preferably in a distinct manner from the first set of ranges 157. Highlighting each set of ranges in a different manner provides a means of visually discerning each respective range. Although in the figure, the two sets of ranges 157, 159 encompass entirely different ranges, according to the invention, the two ranges may intersect. Also displayed within the graphical user interface are entry fields for an identifier 163 for the set of ranges, called a threshold number in the figure, and for an action 165, a threshold action in the figure, to be executed by the computer system should the particular set of ranges be satisfied. A field 166 shows the variable along the y-axis which is being set. This field could be expanded if a second parameter were associated with the x-axis. An output field 167 shows the exact boundaries of the current set of ranges.

Push buttons 169, 171, 173 allow the user to save, cancel the set ranges or to request help for manipulating the interface. A relations field 175 has fields for the number of the range which the current set of ranges may have a relationship with, and the relationship itself such as and, or, nor, exclusive or, etc. In this case, the number of the relations field is set to zero, which means that the second set of ranges has no relationship to any other threshold. However, if the number field were set to "one" and the function field were set to "or", the data stream that satisfied either the first or second set of ranges as shown in FIG. 4 would result in the action listed in the action field 165.

The user interface allows the simultaneous setting of ranges for two parameters by manipulating the control element via the mouse or other pointing device. However, for finer control, the user may type in numerical values in the value field 167. If the user does type in numerical values, the ranges 157, 159 will be altered accordingly.

Figure 5A:
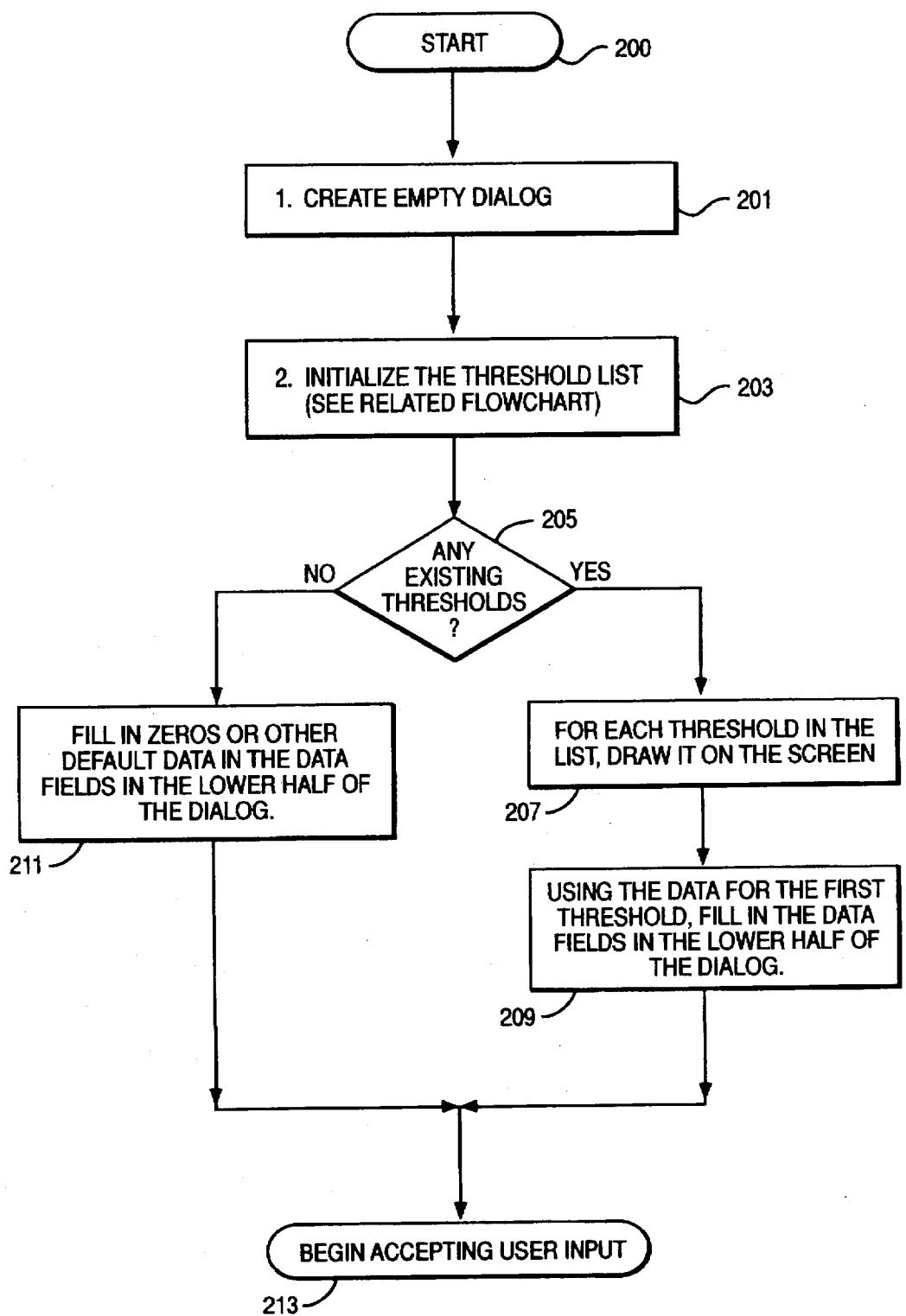
FIGS. 5A and 5B are flow diagram for initializing the graphical user interface and parameter ranges in FIG. 4.
Figure 5B:
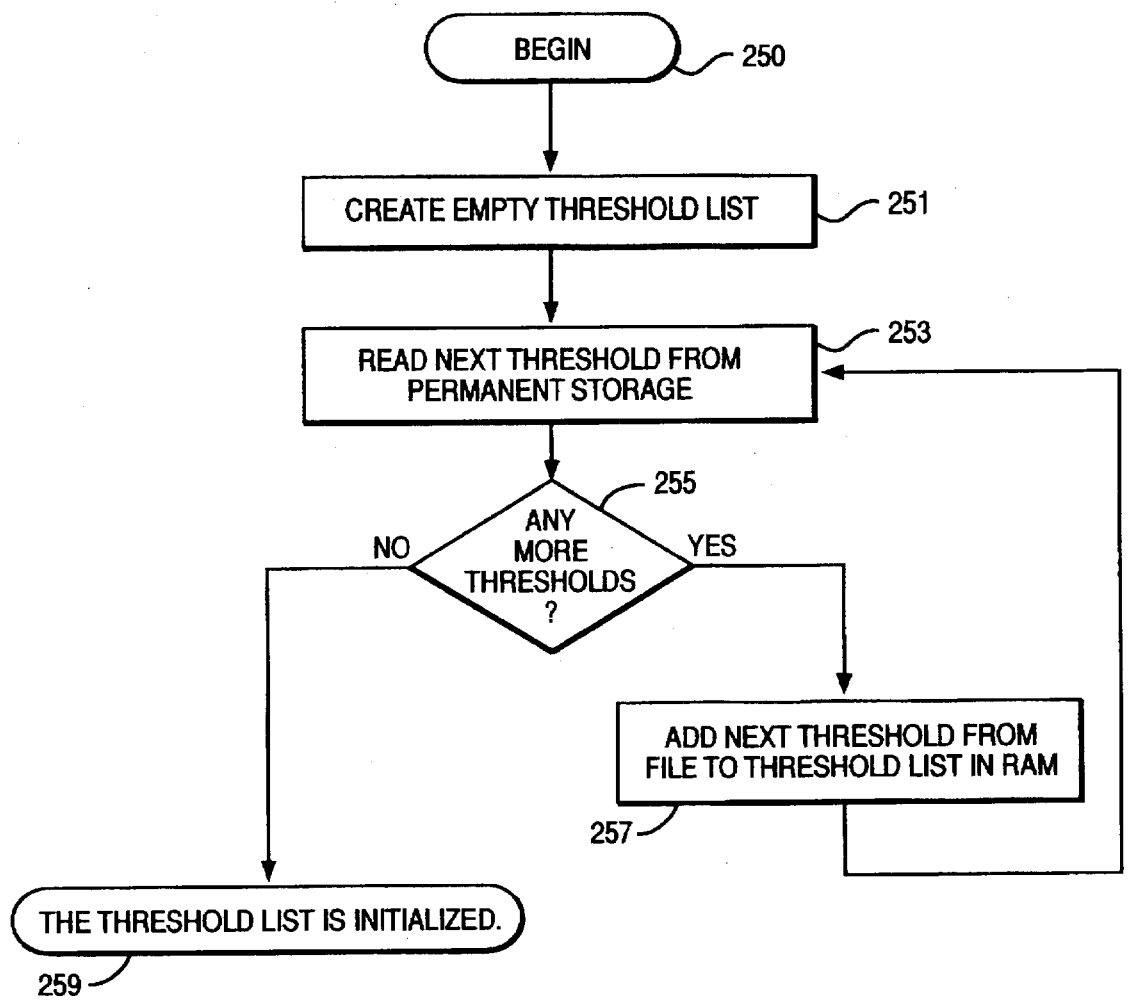

The process for initializing the interface is described with reference to FIG. 5A, the process starts step 200, by creating an empty dialog box, i.e. with none of its fields filled, in step 201. In step 203, the threshold list is initialized. The process for initializing the threshold list is specified in greater detail in connection with FIG. 5B below. In step 205, a test is performed to determine whether there are any existing sets of parameter ranges. If there are, for each parameter range set in the list, display it on the screen within the control window, step 207. In step 209, using the data for the first set of parameter ranges, the data fields in the lower half of the dialog box are filled in. If there are not any existing parameter ranges, the lower half of the dialog box is filled in with zeros or default data in step 211. In step 213, the interface waits to begin accepting user input into the dialog box. In step FIG. 5B, the process for initializing the threshold list is described. The process begins in step 250 and creates an empty threshold list, in step 251. To create an empty threshold list, a pointer to the list is created and that pointer points to a null value, usually zero, because the list is initially empty. As elements are added to that list, the pointer will always point to the first element in the list. In step 253, the next set of parameter ranges from permanent storage is read into the empty threshold list. As the process begins, the first set of parameter ranges will be read into the threshold list. In step 255, a test is performed to determine whether there are anymore parameter range sets, if so, in step 257, the next set of parameter ranges from the file is read into the threshold list created in step 251. Step 253 reads data into a temporary storage buffer in RAM. Step 257 creates an element, copies the data into that element, and adds the element to the list. If there are no more parameter range sets, in step 259, the process of initializing the interface is notified that the threshold list is initialized.

Figure 6:
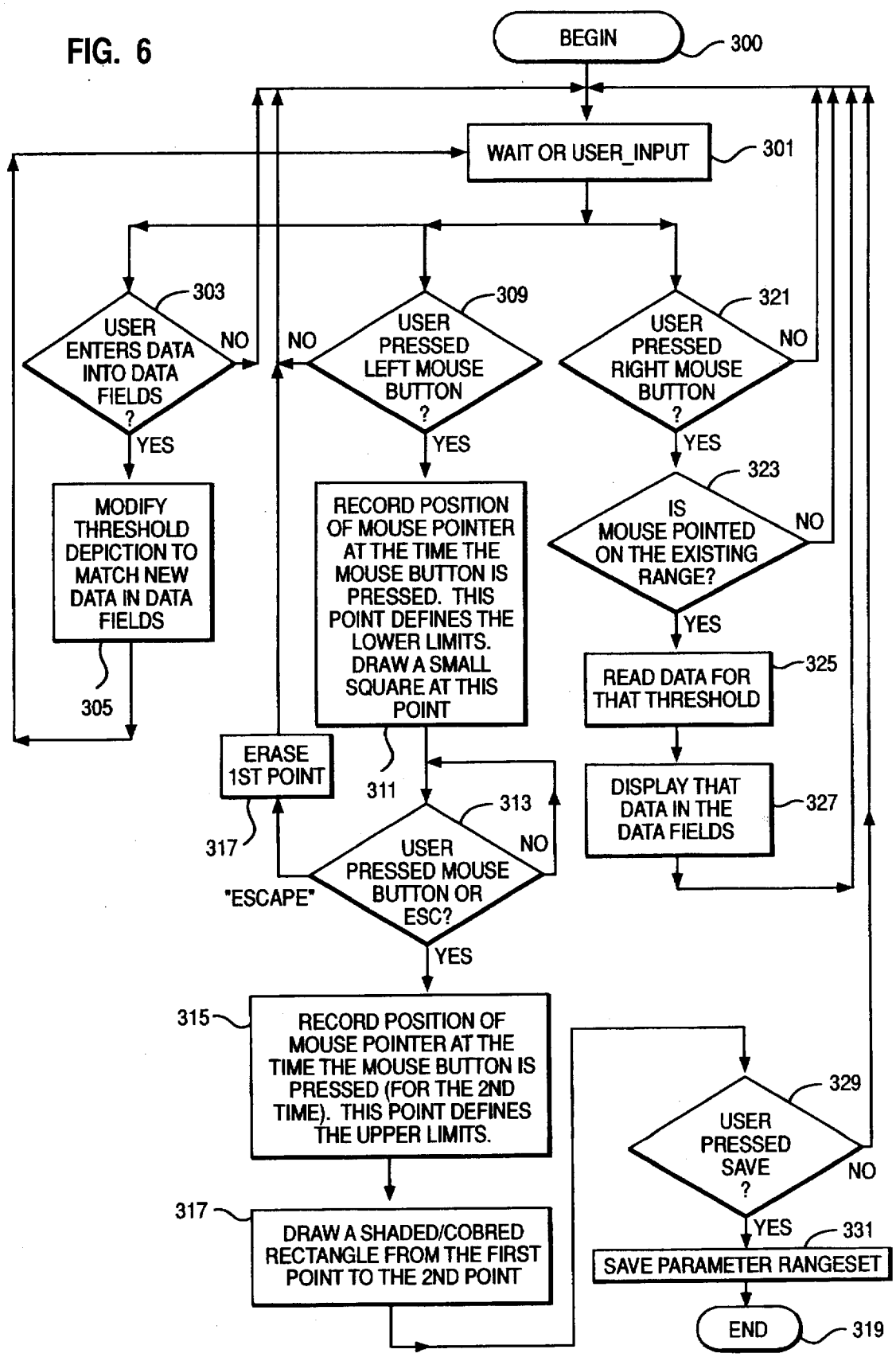
FIG. 6 is a flow diagram for user interaction with the interface.

In FIG. 6, the process by which a user interacts with the interface to establish a set of parameter ranges is described. The process begins in step 300 where the system is waiting for user input, step 301. If user input is detected in step 303, a test is performed to determine whether the user has entered data into any of the data fields in the lower half of the dialog box. If so, in step 305, the appropriate parameter range is modified as well as the depiction of the parameter range within the control window to reflect the new data. In step 301, the process resumes waiting for user input. If the user input was not data in the data fields, the process returns to step 309 to determine whether the user pressed the left mouse button. If so, in step 311, the position of the hot-spot of the mouse pointer at the time the mouse button is pressed is recorded, this point defines one of the corners of the set of parameter ranges. A symbol such as a small square may be displayed in the control window at this point. If the user presses the mouse button in some region than the dialog box or in an inappropriate area of the dialog box, then the presentation manager knows to pass that input on to some other program, such as the desktop manager, or the presentation manager may cause the data field nearest the mouse pointer to be highlighted. When the user clicks in the appropriate region again, the program treats it as if nothing happened in between this click and the first click in the region. After a first position of the mouse pointer is recorded in step 311, the test performed in step 313 detects a second depression of the left mouse button. In step 315, a second position of mouse pointer is recorded. This point defines the second corner of the parameter ranges. In step 317, a rectangle is drawn from the first position to the second position and possibly shaded to note that it is a completed parameter set. If desired the system may keep track of the mouse position and draw a dotted line between the first position and the current position of the mouse pointer. These steps are not illustrated in the figure.

If a test in step 321 determines that the user pressed the right mouse button and the step in step 323 determines that the mouse pointer is on an existing range, in step 325, the data for that set of parameter ranges is read, and in step 327 that data is displayed in the data fields. If the test in step 329 determines that the user pressed "save", then in step 331 that set of parameter ranges is saved into a database or data file. The process continues to wait for user input until the user closes the dialog box.

Figure 7:
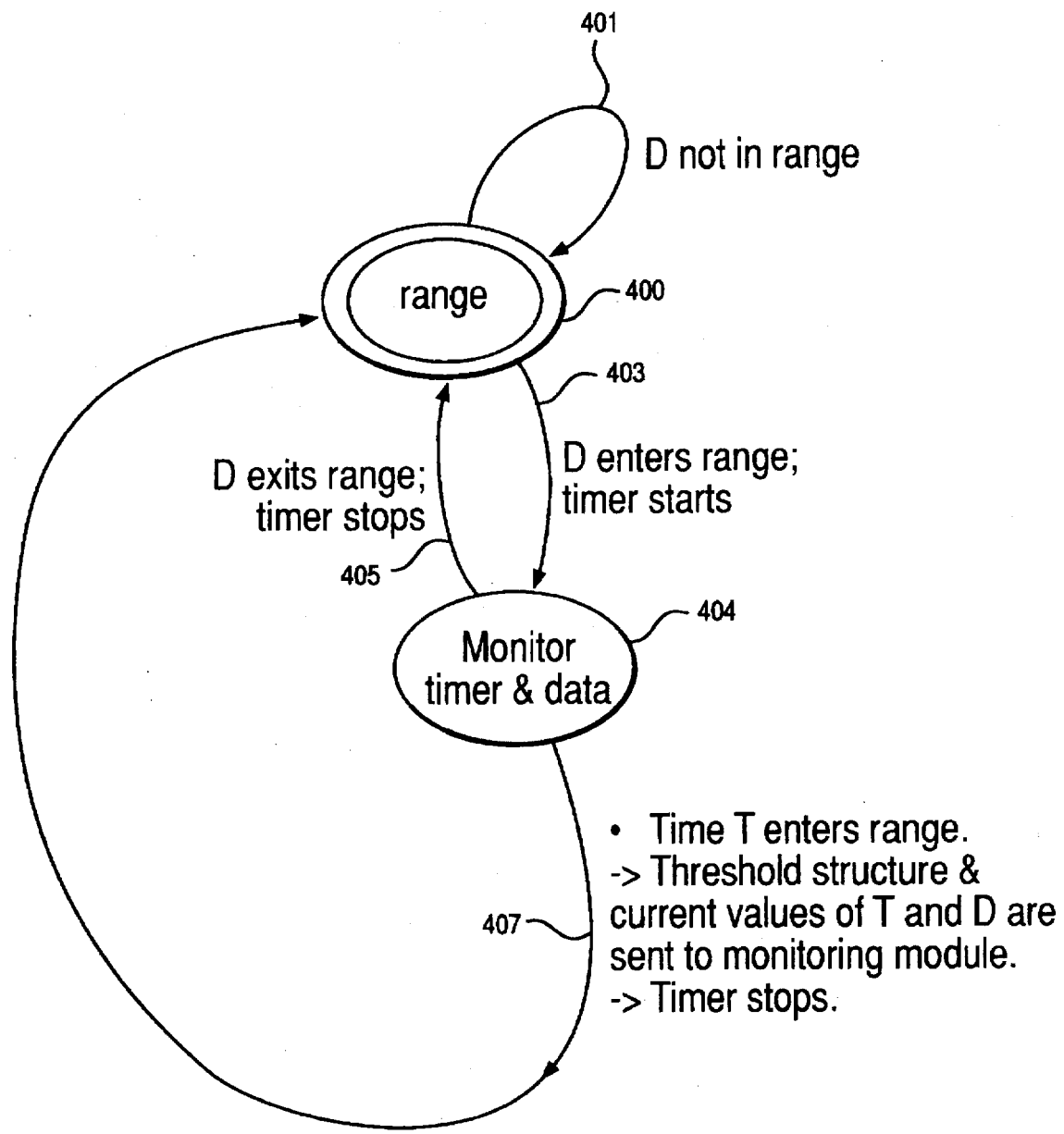
FIG. 7 is a state machine for monitoring a data string according to the ranges specified in the graphical user interface.

Once the parameter ranges are set, they may be used as part of a monitoring program which would then take actions based on satisfying these ranges, e.g., alerting users that these parameter ranges were satisfied. FIG. 7 depicts one state machine used to determine whether conditions are met. In the figure, the x-axis is time and the y-axis is some data "D" time which will be measured as an interval of time and that "D" will be measured with respect to whether it falls within the range specified. Within the state machine, the home state 400 is the initial state of the state machine when the data stream begins to be parsed. As long as "D" is not in the range, path 401 is taken returning the state machine to the home state. If, however, "D" enters the specified range, path 403 is taken which starts the timer and monitors the data in the monitor state 404. If "D" exits the range before the allotted time interval has been satisfied, state machine returns along path 405 to the home state 400. If, however, "D" stays within the range and time "T" is satisfied, the state machine returns to home state along path 407, where the threshold structure and the values of "T" and "D" are sent to the monitoring module and the timer is stopped.

Once the state machine determines that the range is satisfied, the monitoring program handles the determination of the actual alarms based on the relationships which the range may have with other ranges. For example, if there was an "and" relationship, the monitoring program would look to a second state machine to determine whether the range conditions of a second set of parameters were satisfied before alerting users or taking other actions.

Figure 8:
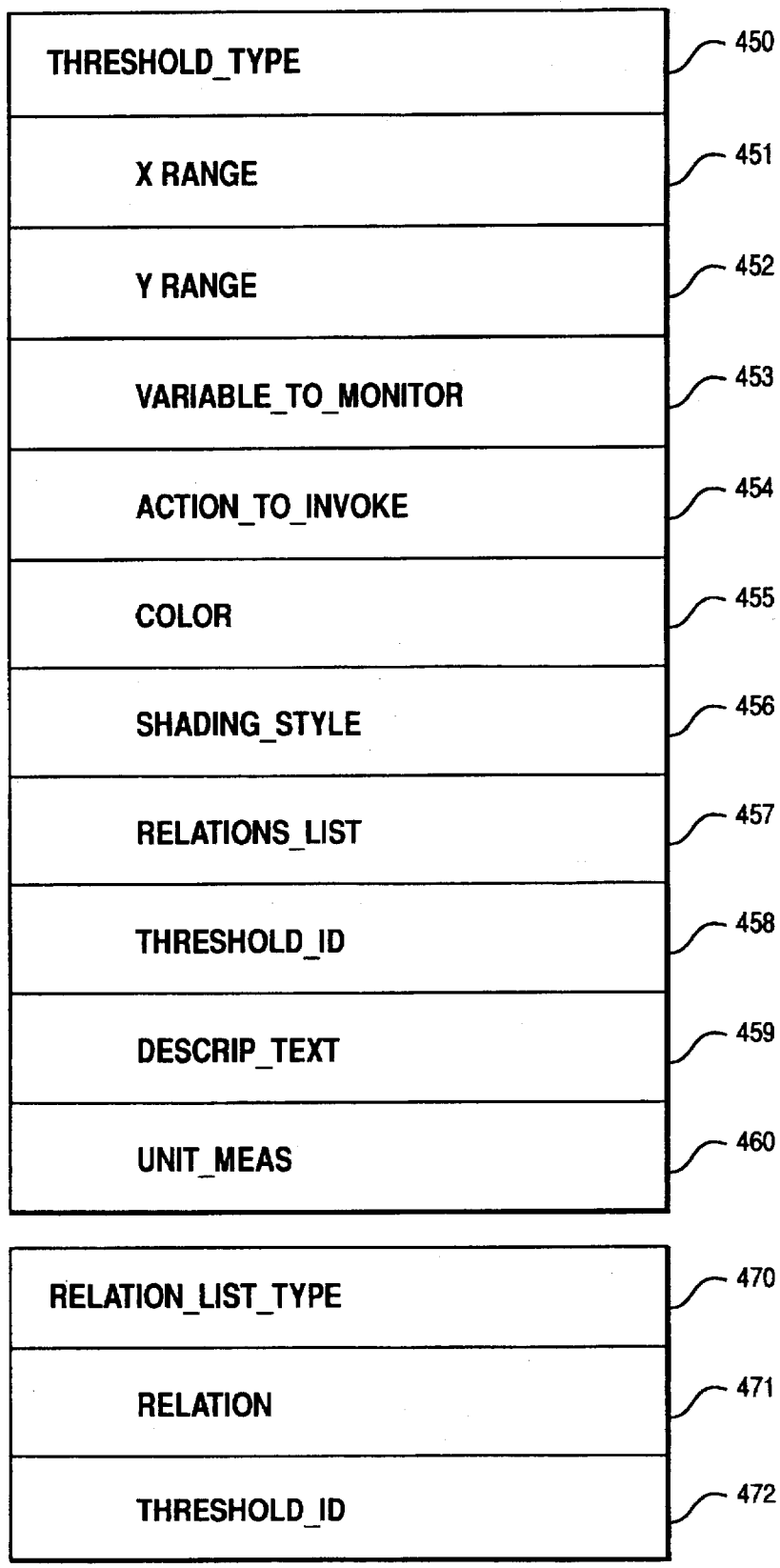
FIG. 8 is a data structure of the ranges sent to the monitor module.

The data structure of the set of ranges as it might be sent from the user interface to the monitor module is depicted in FIG. 8. Each data structure would include a plurality of data fields for the containing information about the set of parameter ranges. These fields would include a type field 450, which would determine whether the ranges were absolute values, represented intervals within the parameters, e.g., five minutes or a change in temperature of 5₀C or percentage changes. There would also be an x-range field 451 for the lower and upper values of the parameter along the x-axis and a y-range field 453 for the lower and upper values of the parameter portrayed along the y-axis. There would be a field 454 for the variable(s) to monitor, the action field 454 which would contain the action to perform when the ranges are satisfied or exceeded. There could also be presentation fields 455, 456 containing information about the color or shading style by which this set of parameter ranges should be portrayed within the control window. The relation list field 457 would provide a pointer to the list of relation list types which allows this range to be related to other parameter ranges. The threshold id field 458 would contain a number or name which is unique to this set of parameter ranges. Other optional fields include a descriptive text field 459 which would describe a set of parameters and could be displayed within the parameter range on the control window and a unit of measurement field 460 containing, for example, "meters", "megabytes", or other units of measure as appropriate.

FIG. 8 also shows a relation list type data structure which allows the set of parameter ranges to be combined with other parameter range sets. The relation field 471 would include information on the type of the relationship to the other parameter ranges such as and, or, nor, exclusive or and so forth. The threshold id field 472, would contain the id of the related threshold.

A pseudo code version of the data structure portrayed in FIG. 8 follows:

Data Structure of Interface

```
threshold_type {
    lower_x, upper_x      : numeric;
    lower_y, upper_y      : numeric;
    variable_to_monitor   :variable_type;
    Action-to-invoke      :Action_type; //action to
                           perform when limits are exceeded
    color                 :color_type;
    shading_style         :shading_type;
    relations_list        :pointer to list of relation_list_type;
    threshold_id          :integer;
    descriptive_text      :text; //optional
    unit_of_measurement   :unit_type;
}
relation_list_type { //allows extendability & combinations of thresholds
    relation              :relation; // type of relation to related threshold
    threshold_id          :integer; // id of related threshold
}
```

The actual interface may be a list, a tree or other sorted data structure of elements of type "threshold-type". When a threshold is triggered, i.e. a set of ranges is satisfied, data is sent to the monitor module. That data consists of the threshold element's data structures which comprise the sets of parameter ranges which were satisfied as well as the actual data measured.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

I claim:

1. A method for specifying a first and a second range of parameter values for a first and a second parameter comprising the steps of:

presenting a control window and a control element movable therein on a display coupled to a computer system;

determining a coordinate of both a first and a second position of the control element movable within the control window, both coordinates having a first and a second component, wherein the first and second positions of the control element are at a first and second corner of a rectangle bounding the first and second ranges; and setting the first range to first parameter values corresponding to the first components of the coordinates of the first and second positions and the second range to second parameter values corresponding to the second components of the coordinates of the first and second positions.

2. The method as recited in claim 1 which further comprises the steps of:

specifying a first operation to be executed if at least one portion of a data stream of the first and second parameters satisfies the first and second ranges;

monitoring the data stream to determine if the first and second ranges are satisfied; and executing the first operation on the computer system if the first and second ranges are determined to be satisfied.

3. The method as recited in claim 1 which further comprises the step of displaying a rectangular highlighted region within the control window having a first and a second corner colocated at the first and second positions respectively.

4. The method as recited in claim 1 wherein the control element is a pointer controlled by a pointing device coupled to the computer system and the method further comprises the steps of:

moving the pointer within the control window in response to signals from the pointing device; and determining the first and second positions in response to signals from the pointing device.

5. The method as recited in claim 1 wherein a third and a fourth range of parameter values are specified respectively for the first and second parameters and the method further comprises the steps of:

determining a coordinate of both a third and fourth position of the control element within the control window, both coordinates having a first and a second component, wherein the third and fourth positions of the control element are at a first and second corner of a rectangle bounding the third and fourth ranges; and setting the third range to first parameter values corresponding to the first components of the coordinates of the third and fourth positions and the fourth range to second parameter values corresponding to the second components of the coordinates of the third and fourth positions.

6. The method as recited in claim 5 which further comprises the steps of:

specifying a first operation to be executed if at least one portion of a data stream of the first and second parameters satisfies the first and second ranges or the third and fourth ranges;

monitoring the data stream to determine if the first and second ranges or the third and fourth ranges are satisfied; and executing the first operation on the computer system if the first and second ranges or the third and fourth ranges are determined to be satisfied.

7. The method as recited in claim 5 which further comprises the steps of:

specifying a first operation to be executed if at least one portion of a data stream of the first and second parameters satisfies the first and second ranges and the third and fourth ranges;

monitoring the data stream to determine if the third and fourth ranges and the third and fourth ranges are satisfied; and executing the first operation on the computer system if the first and second ranges and the third and fourth ranges are determined to be satisfied.

8. The method as recited in claim 5 which further comprises the steps of:

specifying a first operation to be executed if at least one portion of a data stream of the first and second parameters satisfies the first and second ranges and a second operation to be executed if at least one portion of the data stream satisfies the third and fourth ranges;

monitoring the data stream to determine if the first and second ranges or the third and fourth ranges are satisfied;

executing the first operation on the computer system if the first and second ranges are determined to be satisfied; and executing the second operation on the computer system if the third and fourth ranges are determined to be satisfied.

9. The method as recited in claim 5 which further comprises the steps of:

displaying a first rectangular highlighted region within the control window having a first and a second corner colocated at the first and second positions respectively; and displaying a second rectangular highlighted region within the control window having a first and a second corner colocated at the third and fourth positions respectively.

10. The method as recited in claim 9 wherein the first and second regions are highlighted in different manners.

11. A system for specifying a first and a second range of parameter values for a first and a second parameter comprising:

means for presenting a control window and a control element movable therein on a display coupled to a computer system;

means for determining a coordinate of both a first and second position of the control element movable within the control window, both coordinates having a first and a second component, wherein the first and second positions of the control element are at a first and second corner of a rectangular bounding the first and second ranges; and means for setting the first range to first parameter values corresponding to the first components of the coordinates of the first and second positions and the second range to second parameter values corresponding to the second components of the coordinates of the first and second positions.

12. The system as recited in claim 11 which further comprises:

means for specifying a first operation to be executed if at least one portion of a data stream of the first and second parameters satisfies the first and second ranges;

means for monitoring the data stream to determine if the first and second ranges are satisfied; and means for executing the first operation on the computer system if the first and second ranges are determined to be satisfied.

13. The system as recited in claim 11 which further comprises:

means for displaying a rectangular highlighted region within the control window having a first and a second corner colocated at the first and second positions respectively.

14. The system as recited in claim 11 wherein the control element is a pointer controlled by a pointing device coupled to the computer system and the system further comprises:

means for moving the pointer within the control window in response to signals from the pointing device; and means for determining the first and second positions in response to signals from the pointing device.

15. The system as recited in claim 11 wherein a third and a fourth range of parameter values are specified respectively for the first and second parameters and the system further comprises:

means for determining a coordinate of both a third and a fourth position of the control element within the control window, both coordinates having a first and a second component, wherein the third and fourth positions of the control element are at a first and second corner of a rectangle bounding the third and fourth ranges; and means for setting the third range to first parameter values corresponding to the first components of the coordinates of the third and fourth positions and the fourth range to second parameter values corresponding to the second components of the coordinates of the third and fourth positions.

16. The system as recited in claim 15 which further comprises:
- means for specifying a first operation to be executed if at least one portion of a data stream of the first and second parameters satisfies the first and second ranges or the third and fourth ranges;
- means for monitoring the data stream to determine if the first and second ranges or the third and fourth ranges are satisfied; and
- means for executing the first operation on the computer system if the first and second ranges or the third and fourth ranges are determined to be satisfied.

17. The system as recited in claim 15 which further comprises:
- means for specifying a first operation to be executed if at least one portion of a data stream of the first and second parameters satisfies the first and second ranges and the third and fourth ranges;
- means for monitoring the data stream to determine if the first and second ranges and the third and fourth ranges are satisfied; and
- means for executing the first operation on the computer system if the first and second ranges and the third and fourth ranges are determined to be satisfied.

18. The system as recited in claim 15 which further comprises:
- means for specifying a first operation to be executed if at least one portion of a data stream of the first and second parameters satisfies the first and second ranges and a second operation to be executed if at least one portion of the data stream satisfies the third and fourth ranges;
- means for monitoring the data stream to determine if the first and second ranges or the third and fourth ranges are satisfied;
- means for executing the first operation on the computer system if the first and second ranges are determined to be satisfied; and
- means for executing the second operation on the computer system if the third and fourth ranges are determined to be satisfied.

19. The system as recited in claim 15 which further comprises:
- means for displaying a first rectangular highlighted region within the control window having a first and a second corner colocated at the first and second positions respectively; and
- means for displaying a second rectangular highlighted region within the control window having a first and a second corner colocated at the third and fourth positions respectively.

20. The system as recited in claim 19 wherein the first and second regions are highlighted in different manners.

21. The system as recited in claim 19 further comprising:
- a memory coupled to a system bus for storing sets of instructions to operate the computer system;
- a processor coupled to the system bus to execute the sets of instructions;
- a display coupled to the system bus for displaying the control window and control element; and
- a pointing device coupled to the system bus to control the movement of the control element within the control window.

22. A computer memory device for storing computer readable instructions for specifying a first and a second range of parameter values for a first and a second parameter comprising:
- means for presenting a control window and a control element movable therein on a display coupled to a computer system;
- means for determining a coordinate of a first and a second position of the control element within the control window, both coordinates having a first and a second component, wherein the first and second positions of the control element are at a first and second corner of a rectangle bounding the first and second ranges;
- means for setting the first range to first parameter values corresponding to the first components of the coordinates of the first and second positions and the second range to second parameter values corresponding to the second components of the coordinates of the first and second positions
- wherein the means are activated when the device is coupled to and accessed by a computer.

23. The device as recited in claim 22 which further comprises:
- means for specifying a first operation to be executed if at least one portion of a data stream of the first and second parameters satisfies the first and second ranges;
- means for monitoring the data stream to determine if the first and second ranges are satisfied; and
- means for executing the first operation on the computer system if the first and second ranges are determined to be satisfied.

24. The device as recited in claim 22 which further comprises:
- means for displaying a rectangular highlighted region within the control window having a first and a second corner colocated at the first and second positions respectively.

25. The device as recited in claim 22 wherein the control element is a pointer icon controlled by a pointing device coupled to the computer system and the product further comprises:
- means for moving the pointer icon within the control window in response to signals from the pointing device; and
- means for determining the first and second positions in response to signals from the pointing device.

26. The device as recited in claim 22 wherein a third and a fourth range of parameter values are specified respectively for the first and second parameters and the product further comprises:
- means for determining a coordinate of both a third and a fourth position of the control element within the control window, both coordinates having a first and a second component wherein the third and fourth positions of the control element are at a first and second corner of a rectangle bounding the third and fourth ranges; and
- means for setting the third range to first parameter values corresponding to the first components of the coordinates of the third and fourth positions and the fourth range to second parameter values corresponding to the second components of the coordinates of the third and fourth positions.

27. The device as recited in claim 26 which further comprises:
- means for specifying a first operation to be executed if at least one portion of a data stream of the first and second parameters satisfies the first and second ranges or the third and fourth ranges;

means for monitoring the data stream to determine if the first and second ranges or the third and fourth ranges are satisfied; and means for executing the first operation on the computer system if the first and second ranges or the third and fourth ranges are determined to be satisfied.

28. The device as recited in claim 26 which further comprises:

means for specifying a first operation to be executed if at least one portion of a data stream of the first and second parameters satisfies the first and second ranges and the third and fourth ranges;

means for monitoring the data stream to determine if the first and second ranges and the third and fourth ranges are satisfied; and means for executing the first operation on the computer system if the first and second ranges and the third and fourth ranges are determined to be satisfied.

29. The device as recited in claim 26 which further comprises:

means for specifying a first operation to be executed if at least one portion of a data stream of the first and second parameters satisfies the first and second ranges and a second operation to be executed if at least one portion of the data stream satisfies the third and fourth ranges;

means for monitoring the data stream to determine if the first and second ranges or the third and fourth ranges are satisfied;

means for executing the first operation on the computer system if the first and second ranges are determined to be satisfied; and means for executing the second operation on the computer system if the third and fourth ranges are determined to be satisfied.

30. The device as recited in claim 26 which further comprises:

means for displaying a first rectangular highlighted region within the control window having a first and a second corner colocated at the first and second positions respectively; and means for displaying a second rectangular highlighted region within the control window having a first and a second corner colocated at the third and fourth positions respectively.

31. The device as recited in claim 30 wherein the first and second regions are highlighted in different manners.

* * * * *

UNITED STATES PATENT AND TRADEMARK OFFICE
CERTIFICATE OF CORRECTION

PATENT NO. : 5,680,560
DATED : October 21, 1997
INVENTOR(S) : David Bernard Gaertner It is certified that error appears in the above-indentified patent and that said Letters Patent is hereby corrected as shown below:

Col. 9, line 45, after the second "the", please insert -- first and second ranges and the--;
line 46, after the first "ranges", please delete "and the third and fourth ranges".

Signed and Sealed this

Sixteenth Day of June, 1998

Attest:

BRUCE LEHMAN

Attesting Officer

*Commissioner of Patents and Trademarks*